4 Sheets—Sheet 1.
9871X
D. GERRISH.
SHIP BUILDING.
Patented July 2, 1836.
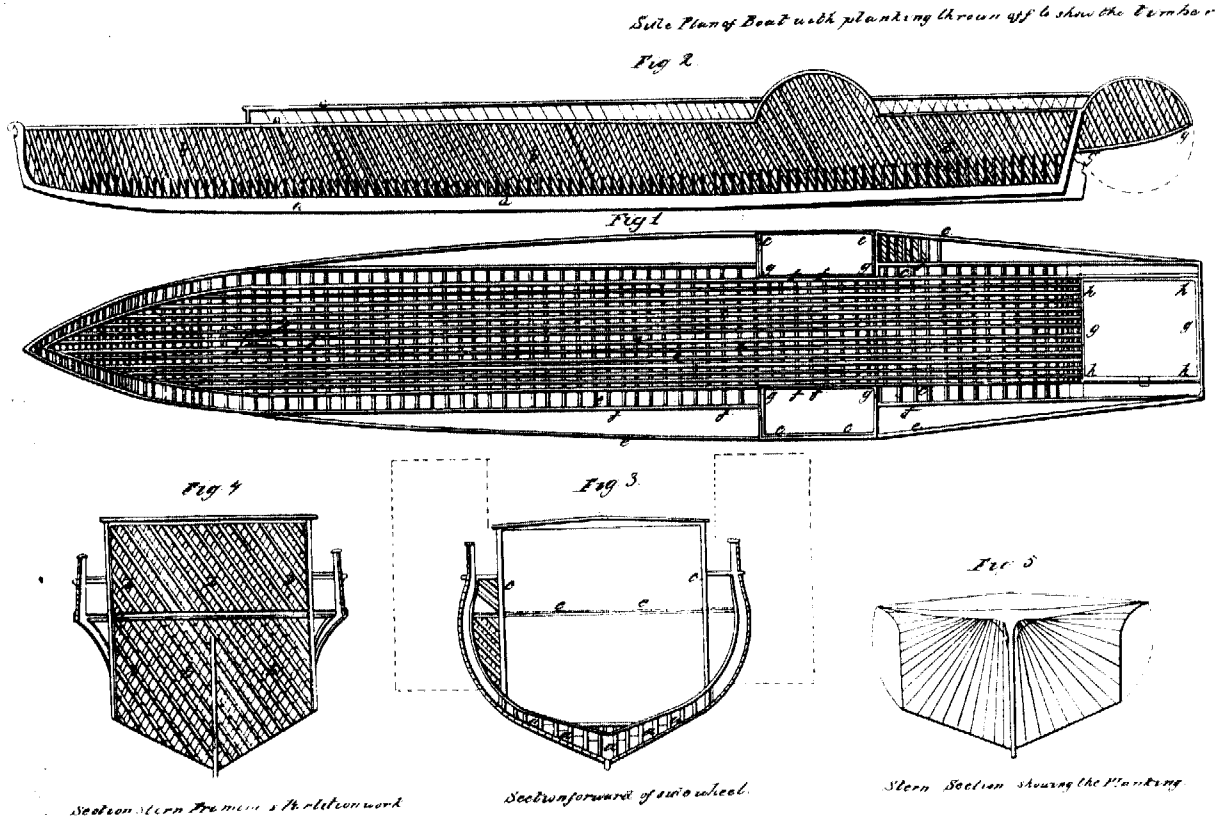
THE MORRIS PETERS CO. PHOTO-LITHO. WASHINGTON.

9871X
4 Sheets—Sheet 2.
D. GERRISH.
SHIP BUILDING.
Patented July 2, 1836.
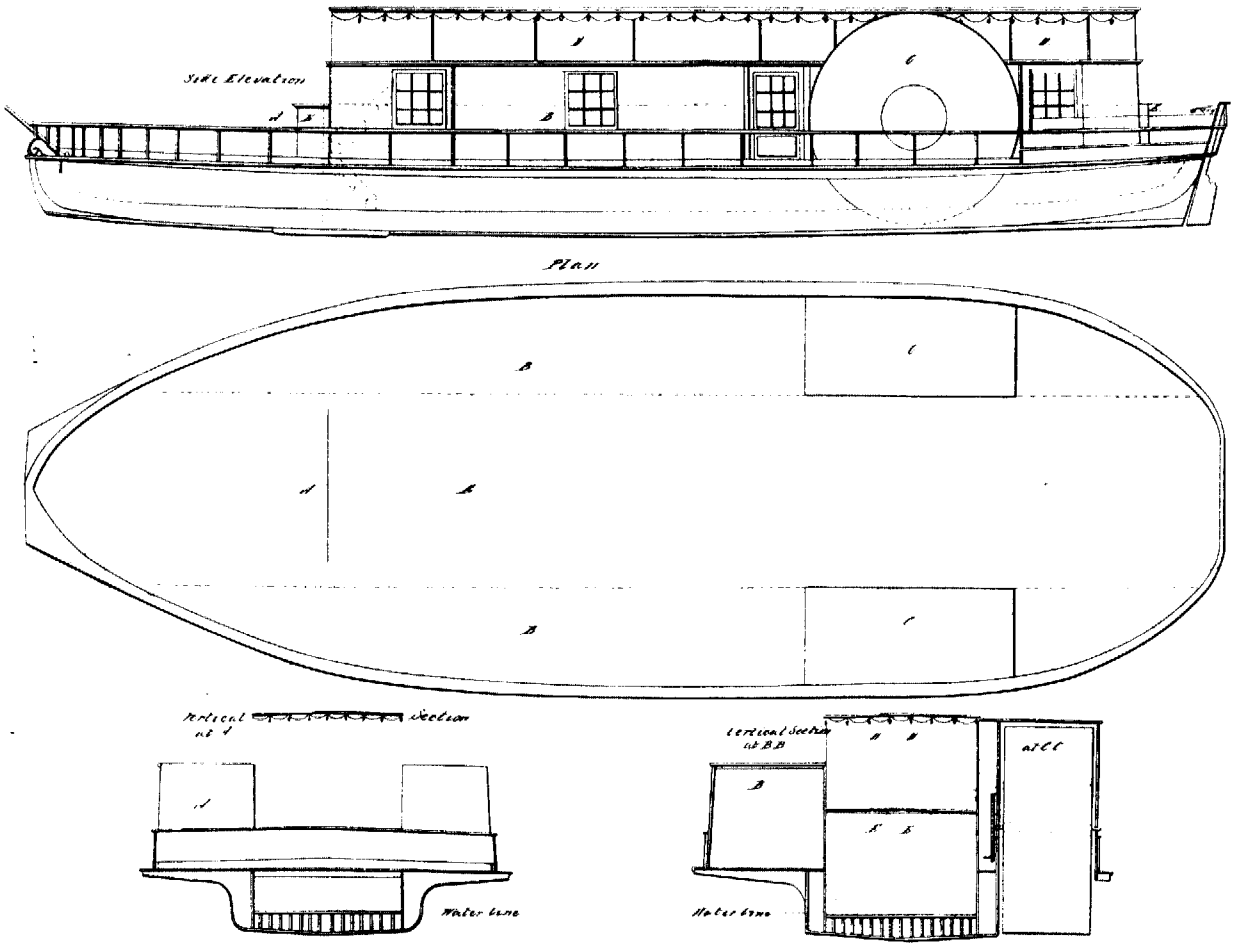

9871X
D. GERRISH.
SHIP BUILDING.
Patented July 2, 1836.
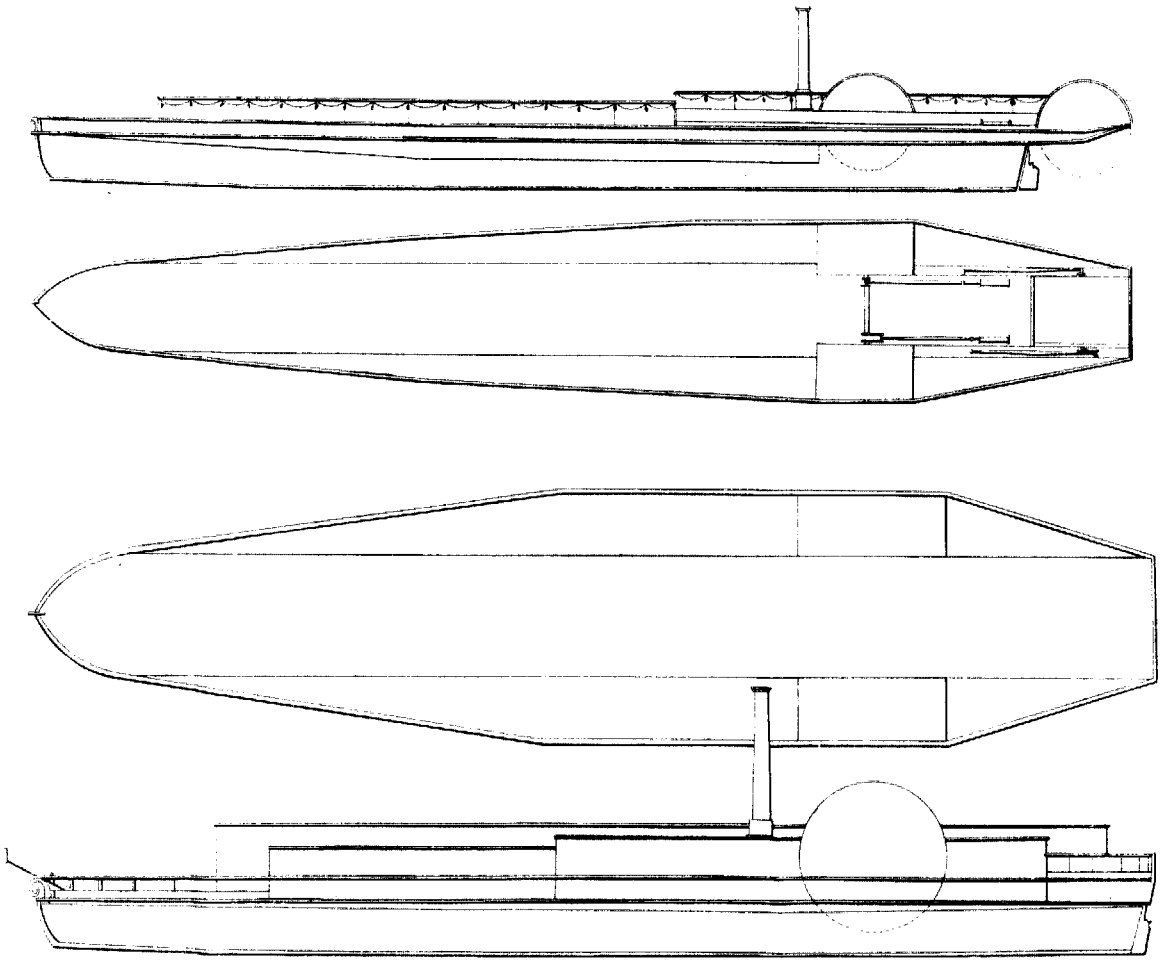

9871X
D. GERRISH.
SHIP BUILDING.
Patented July 2, 1836.
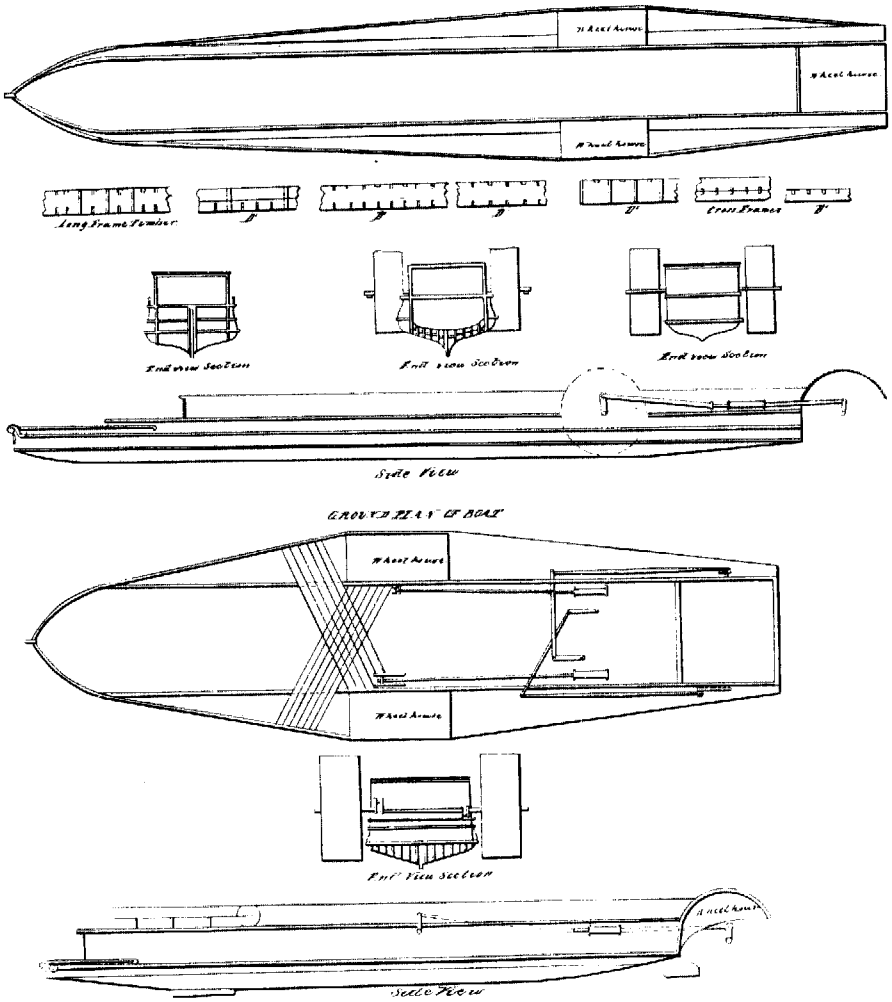
THE NORRIS PETERS CO. PHOTO-LITHO., WASHINGTON, D. C.

9871

July 2, 1836

1,

Daniel Gerrish.
Letters Patent. Patented July 2nd 1836.
The Schedule referred to in these Letters Patent and making part of the same, con
taining a description in the words of the said Daniel Gerrish himself, of his Im
provement in the construction of Vessels."

---

To all whom it may concern. Be it known, that I, Daniel Gerrish of
Boston, in the State of Massachusetts, have invented, certain Improvements in the
manner of constructing or building Vessels, which are applicable to Vessels of war,
and those intended to navigate the Ocean, as well as to those employed upon rivers
or other waters, all which may be propelled by steam, or otherwise - And I do hereby
declare that the following is a full and exact description thereof, reference being
had, to the drawings, which accompany and make a part of this specification.
And I do further declare, that although I have herein given certain general
and particular admeasurements, I have done so for the purpose of facilitating
the description, only, and not with any view, or in any manner, to limit myself
in this respect, as much latitude may be allowed therein, whilst the principle
of construction remains unchanged.
In the accompanying drawings Figures 1 and 2, represent plans of the
skeleton framing, of the vessel, or steam boat, figure 2, being a side view, and
are drawn on a scale of [illegible] of an inch, to a foot, figures 3 and 4 are cross sections
just forward and abaft, the side wheels, drawn to a scale of [illegible] of an inch, to the
foot. Fig. 5, shows the planking of the stern, the other figures will be referred to [illegible]
in their appropriate specifications.
The vessel is supposed to be 240 feet in length, 30 in width forward, and [illegible]
feet abaft the side wheels.
The Improvement consists in, 1st, the manner of constructing, and connecting
the bottom, and sides, of the vessel, as it is thought, it will combine the greatest possible
degree of strength, with the least possible weight of timber, - to effect which, the lower
part, or bottom, of the vessel, is composed of deep timbers, in width about two feet, in
thickness five inches, extending in parallel lines, at the distance of one foot, each from
the other, the whole length of the vessel, Fig. 1, 2, & 3 a, a, a, a.

The lower half of these main timbers, are to be crossed, at right angles, at the same distance, of one foot, from each other, by similar timbers, of one foot in width, halved and grooved into them. The lower edges of all which timbers, are to be so shaped, as to receive the covering which forms the bottom, of the vessel, and the upper edges, of said cross timbers, are to be floored over, between the main timbers, thus forming a series of air tight cells, of one square foot, each diameter, see fig. 1, 2 & 3.

The upper half, of the main timbers, are to be crossed, in a similar manner at the distance of four feet, or immediately over every fourth cross timber, in the lower series of cells, see sections b, b, b, b.

Additional timbers may be laid flatways, between each of these, as at fig. 3 or at any angles, crossing each other, and being halved, and grooved into the main timbers, as seen at fig. 1, c, c, c, c, and (after the side timbers are framed into the bulk, or bottom timbers,) these upper edges, of all the timbers, are to be planked over thereby forming the flooring of the vessel, and constituting a second series, of cells, of one by four feet each, which may be made air tight, or a part of them finished, with hatchways, for the purpose of stowing ballast or cargo. see sections b, b, b, b.

2nd. The timbers which form the sides, and top frames, of the vessel, are framed, and into, the cross timbers, of the bottom; and are strengthened, by an additional framing, of the lattice work, halved into them, and covered in the usual manner, by planks, and ceiling, see fig. 1, 2, & 3. d, d, d, d.

3rd. To give additional strength and firmness, to the vessel, a frame erected at the distance of four feet, from each side, and extends its whole length, may framed into the timbers, of the bottom, and forms, the sides of the vessel, at the [illegible] occupied by the wheels, and the frames of the cabins, and upper works, as seen at fig. 2, & 3, e, e, e, e. The four feet space between this frame, and the sides, is to be intersected by transverse partitions as may be desired.

4th. In order to establish, a thorough system, of bracing in every part and direct. the timbers which form the main deck, are also halved and grooved into each other crossing at any angles, [illegible], and being fastened to the side frames, as at fig 1 & 3, e, e, e, e.

5th. In a vessel, or steam boat, thus constructed, an additional rudder, may be [illegible]

to rotate, in a recess, on a shaft, which decends through an open trunk, or well, from the deck to the rudder, which will when required, secure a more perfect control over the direction of the vessel, and may be preserved from injury by being more or less rais ed, within the recess formed formed for that purpose, as seen at fig. 1. f. f.

6th. In steam vessels, designed for sea service, I purpose to place a part of the Paddle Wheels, in a recess, of four feet, formed in the sides of the vessel, allowing them to project six feet, they being ten feet wide, and twenty four in diameter, see fig. 1. g. The lines e, e. show the wheel guards and f f, the sides of the vessel.

I propose also to place an additional wheel, in the stern, occupying the en tire width of that part of the vessel, say 20 feet, in length, and 22 feet in diameter as at Fig. 1. h. h.

Figs. 6 & 7, show the location of two horizontal Engines, within the guards, and each on a line, and connected by a shackle bar, with the crank, of its appro priate side wheel, and also by another shackle bar, to the crank, on one end of the stern wheel shaft, this last named shackle bar, being connected, to, or with a cross head, by a guide rod, i, i, i, i.

The three wheels, being thus connected, with the two cranks, on the one side, at right angles with the two cranks, of the other side j, j, all the wheels, will be uniform receiving, the full action of the engines, viz. as much so while two of the cranks are passing their dead centres, as at any other part, or point, of the revolution. And also, when by the motion of the waves, either of the three wheels, has little or no hold upon the water, the whole power of both Engines will still be exerted upon the immersed wheel or wheels.

7th. I propose, when it is desirable, to place the chimney, or smoke pipe, hori zontally, along the sides, or guards of the vessel, allowing the smoke to escape, in the rear of the stern, or side wheels, the action of which will be calculated to promote the draught through them, see fig. 7. k. k.

8th. I intend sometimes, to form the covering of the bottom timbers, of sheet iron, or other metal, instead of plank; which will secure, most of the benefits arising from iron Steam Boats whilst the vessel will be tighter, and, much more secure, from danger in case of leak or accident, as the water would be confined to a comparatively small number of 9th. When the vessel is intended to navigate shallow waters, the form of the bottom

9871

July 2, 1836 should be nearly flat, as drawn at figs. 7 & 8, 9 & 10.

What I claim as my invention in the above described Boat or Vessel is, 1st The manner of constructing or framing and connecting the bottom and sides of the Vessel as fully described in specification Articles 1 & 2.

2nd. The additional frame as erected, and for the purpose set forth and described in Art. 3, and 4, in combination with the bottom, as in Art. 1, and 2.

3rd. The use and construction of a second or additional rudder, in combination with a Boat or Vessel of this construction as shown in Art. 5.

The application or forming the bottom covering of sheet Iron or other metal without planking, confining my claim to its combination with Vessels of this construction, as in art. 1.

Witnesses
B. H. [illegible]
[illegible] Tucker

Daniel Gerrish

Exd. [illegible]

([illegible] and [illegible] anew — Decr. 14. 1840.)

(1568 words)

(Drawing.)